United States Patent [19]

Kriz et al.

[11] Patent Number: 4,530,053
[45] Date of Patent: Jul. 16, 1985

[54] DMA MULTIMODE TRANSFER CONTROLS

[75] Inventors: Thomas A. Kriz, Sandy Hook; Andrew S. Potemski, New Milford, both of Conn.

[73] Assignee: International Business Machines Corporation, Armonk, N.Y.

[21] Appl. No.: 485,084

[22] Filed: Apr. 14, 1983

[51] Int. Cl.³ .............................................. G06F 9/00
[52] U.S. Cl. ................................................... 364/200
[58] Field of Search ............................... 364/200, 900

[56] References Cited

U.S. PATENT DOCUMENTS

| 4,172,283 | 10/1979 | Kober | 364/200 |
|---|---|---|---|
| 4,213,177 | 7/1980 | Schmidt | 364/200 |
| 4,371,925 | 2/1983 | Carberry et al. | 364/200 |
| 4,371,928 | 2/1983 | Barlow et al. | 364/200 |
| 4,375,665 | 3/1983 | Schmidt | 364/206 |
| 4,467,447 | 8/1984 | Takahashi | 364/900 |

Primary Examiner—Gareth D. Shaw
Assistant Examiner—John G. Mills
Attorney, Agent, or Firm—James E. Murray

[57] ABSTRACT

Circuitry is provided to be used in association with a single transfer mode DMAC device to enable a programmer to control the number of bytes transferred during a DMA transfer cycle. The circuitry receives a coded mode control message from the microprocessor before transferring control of the data and address busses to the DMAC and generates one or both of two data transfer strobe signals which instruct the memory to transfer contiguous bytes, contiguous high alternate order bytes, or contiguous low alternate order bytes, or both.

2 Claims, 4 Drawing Figures ized embodiment of the invention of which:

DMA MULTIMODE TRANSFER CONTROLS

The present invention relates to the transfer of data in a microcomputer system using a direct memory access controller (DMAC) to control the address and data busses of the system.

Direct memory access controllers (DMACs) are used in microcomputer systems to transfer data directly between peripheral devices and main memory by temporarily taking over control of the microcomputer's data and address busses from the system microprocessor unit (MPU). An example of such a DMAC is the MC6844 sold by Motorola, Inc. and described beginning on page 4-441 of their manual entitled "Motorola Microprocessors" (Series B, second presenting).

The MC6844 is natively designed for transferring data synchronously in a microcomputer with an eight bit wide data bus. However, it can be used to transfer data asynchronously in a microcomputer with a 16 bit data bus driven by a MC68000 MPU with additional timing support hardware. In such a microcomputer system, the MC6844 produces a direct substitute for the read/write (R/W) pulse of the MC68000 which indicates whether the data transfer is a read or write transfer relative to main memory. Furthermore, the ($\overline{TXSTB}$) signal produced by the MC6844 DMAC can be used to generate a substitute for the address strobe ($\overline{AS}$) signal of the MC68000 MPU. The $\overline{AS}$ signal or its substitute generated from the $\overline{TXSTB}$ signal indicates to main memory or a peripheral device attached to the microcomputers bus system, when there is a valid address on the address bus to support execution of a transfer cycle. In copending patent application Ser. No. 485,085 filed on even data herewith and entitled "DMA Asynchronous Mode Clock Stretch" it is pointed out how the length of the $\overline{TXSTB}$ pulse and therefore the substitute for the $\overline{AS}$ pulse can be extended to accomodate operational delays in main memory to permit asynchronous operation.

The above-described MC6844 DMAC device is essentially a single mode transfer device. It is designed to transfer data either one eight bit byte or one 16 bit word at a time and does not natively generate control signals to selectively support data transfers with variation of the number of bytes in the data.

THE INVENTION

In accordance with the present invention, circuitry is provided to be used in association with a single transfer mode DMAC device to enable a programmer to control the number of bytes transferred during a DMA transfer cycle. The circuitry receives a coded mode control message from the microprocessor before transferring control of the data and address busses to the DMAC and generates one or both of two data transfer strobe signals which instruct the memory to transfer contiguous bytes, contiguous high alternate order bytes, or contiguous alternate low order bytes, or both.

Therefore, it is an object of the present invention to provide a multi-mode data transfer capability using a DMAC device which by itself is capable of only a single mode of data transfer.

It is another object of the invention to provide capability to transfer data between upper byte locations in memory and lower byte locations in peripheral devices when executing DMA transfers in a contiguous byte transfer mode.

THE DRAWINGS

These and other objects of the invention can best be understood by referring to the accompanying drawings of a illustrated embodiment of the invention of which:

DETAILED DESCRIPTION

Figure 1:
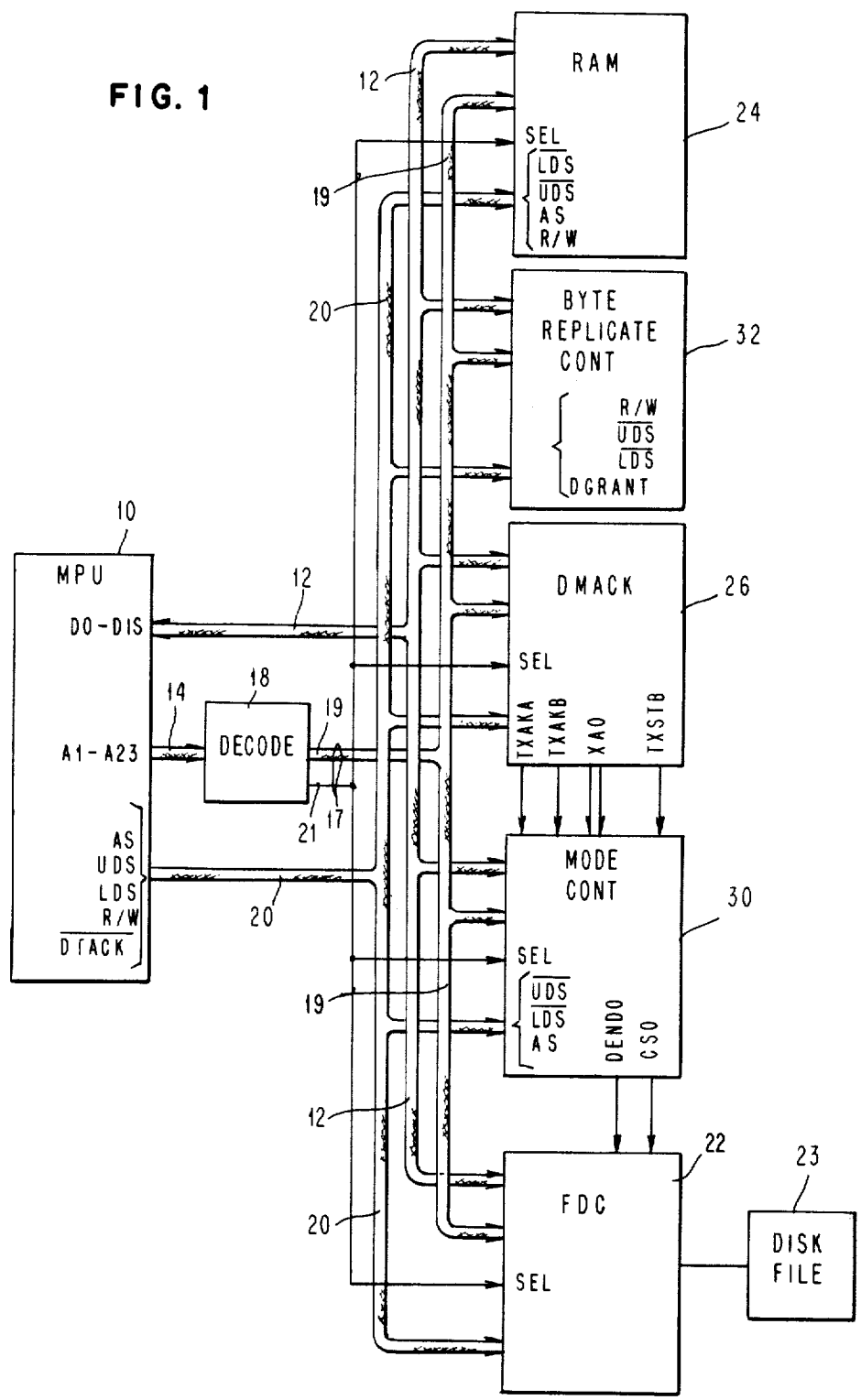
Fig. 1 is a block diagram of data transfer systems incorporating the present inention.

The MC68000 microprocessor 10 contains a 16 bit bidirectional general purpose data bus 12 for the transfer of data between the microprocessor 10 and a plurality of associated devices. The MC68000 microprocessor also has a 23 bit unidirectional address bus 14 capable of addressing 8 megawords of data on associated devices. The address bus signal from the microprocessor 10 is fed into a decoder 18 which decodes a portion of the address bus signal to select a device access line on the system address bus 17. The device access line enables only one of the plurality of devices attached to the system address bus 17 to respond to the address identified by the storage location portion 19 of the system address bus 17.

The access line portion 21 of the address bus 17 is fed to the data transfer acknowledgement (DTACK) signal generator (not shown). As explained in co-pending U. S. patent application Ser. No. 470,025, filed Feb. 25, 1983 and entitled "Centralized Generation of Data Transfer Acknowledge Pulses for Microprocessor", the DTACK generator supplies a $\overline{DTACK}$ pulse, to regulate the length of the data transfer cycle and consequently the length of the $\overline{AS}$ pulse of the microprocessor 10. The timing of this $\overline{DTACK}$ pulse relative to the upper data strobe ($\overline{UDS}$) and lower data strobe ($\overline{LDS}$) pulses generated by the MC68000 microprocessor varies as a function of the response time of the device transmiting or receiving data from the microprocessor 10 during the data transfer cycle.

The $\overline{UDS}$ and $\overline{LDS}$ signals are signals generated by the MC68000 CPU 10 and placed on the system control signal bus 20. Two signals together with the $\overline{AS}$, R/W and $\overline{DTACK}$ pulses regulate the asynchronous transfer of data between the CPU 10 and main memory 24 or the CPU 10 and an I/O device such as disc file 23. Definitions of all these signals used to transfer data asynchronously by the MC68000 MCU can be found in a manual entitled "16 Bit Microprocessor Users Manual" (third edition) published by Prentice Hall, Englewood Cliffs, N.J. 07632. The read and write cycles for a microcomputer using the MC68000 microprocessor is described in this manual beginning on page 37. As can be gathered from these definitions, the $\overline{UDS}$ and $\overline{LDS}$ signals are used to signal to the peripheral device or main memory which data bytes are involved in a transfer. The $\overline{LDS}$ pulse indicates that bits D0 to D7 of the data bus 12 are involved in the transfer and the $\overline{UDS}$ pulse indicates bits D8 to D15 of the data bus 12 are involved in the transfer.

In a typical processor controlled transfer of data from a disc file 23 through a controller 22 to main memory 24, the microprocessor 10 will provide access data on address bus 14. Decoder 18 will then generate an access signal for the file and a data address in the file. A data item will then be transferred from the file to the microprocessor 10 and the DTACK generator via control bus 20 will provide a DTACK signal to the processor at the completion of the transfer. The microprocessor 10 then starts a MPU sequence that ends in termination of the data transfer cycle $\overline{AS}$.

A second data transfer cycle may then be executed by the microprocessor 10. This time the transfer is from the microprocessor 10 to the RAM main memory 24 to place in main memory 24 the data item received from the file 23 on the previous cycle. The microprocessor places an address on bus 14 which is decoded by decoder 18 into access line for main memory 24 and an address location in main memory. The data is then transferred to that address and at the completion of the transfer the DTACK generator provides a DTACK signal to the microprocessor 10 so the microprocessor can terminate the data transfer cycle.

In each of these data transfers the CPU 10 asserts either both or one of a $\overline{UDS}$ and $\overline{LDS}$ pulses to indicate whether the data transfer is a word transfer or a byte transfer and if a byte transfer if the upper data byte or lower data byte is being transferred. The main memory 24 or periperal device 23 uses these signals to determine whether to transfer all information on the data bus or ignore the first byte D0 to D7 or the second byte D8 to D15 on the data bus.

From time to time, control of the busses may be turned over to the DMAC 26. Prior to receiving control from the MPU 10, the DMAC 26 must be preloaded or initialized by the MPU 10- with data specifying the starting address of the transfer, the number of bytes to be transferred which of the four DMA channels is to be used etc. With the bus operating in a direct memory access (DMA) mode of operation, data does not pass through the DMAC. Data passes instead directly between the main memory 24 and the file 22. What the DMAC does do is generate the signals to control the data and address busses. However, as mentioned previously, the MC6844 DMAC is natively capable of only a single byte transfer mode of operation. It does not generate the equivalent of the $\overline{LDS}$ and $\overline{UDS}$ signals produced by the MC68000 to differentiate between or combine the two bytes of data together in the data transfer. Therefore, it is not possible to transfer data a word at a time or an upper byte address in memory to a lower byte address in an I/O device using the MC6844 DMAC without additional support hardware.

In accordance with the present invention, circuits are provided for that purpose. Prior to the transfer of control to the DMAC 26, the MPU places data on bits D0 to D7 of the data bus and accesses the mode control circuit 30. The data is a coded message telling the mode control circuit 30 what type of data transfer is to be executed as a function of channel selection mode, either a full word transfer, or a transfer of lower data bytes or upper data bytes or a transfer of contiguous bytes. When the DMAC 26 then takes control, it transmits a transfer strobe $\overline{TXSTB}$ signal and a channel select address to the mode control device. The mode control device then generates the proper $\overline{AS}$, $\overline{LDS}$ and/or $\overline{UDS}$ signals and also appropriately offsets the address supplied by the single mode DMA device and places that address on the address bus. When the data being transferred is placed on the data bus 12 it is received by the byte replicate circuit 32 which duplicates the data placed in one of the byte sections of the data bus 12 in the other byte section of the data bus when the $\overline{UDS}$ and $\overline{LDS}$ signal the existence of a single byte transfer condition.

Figure 2A:
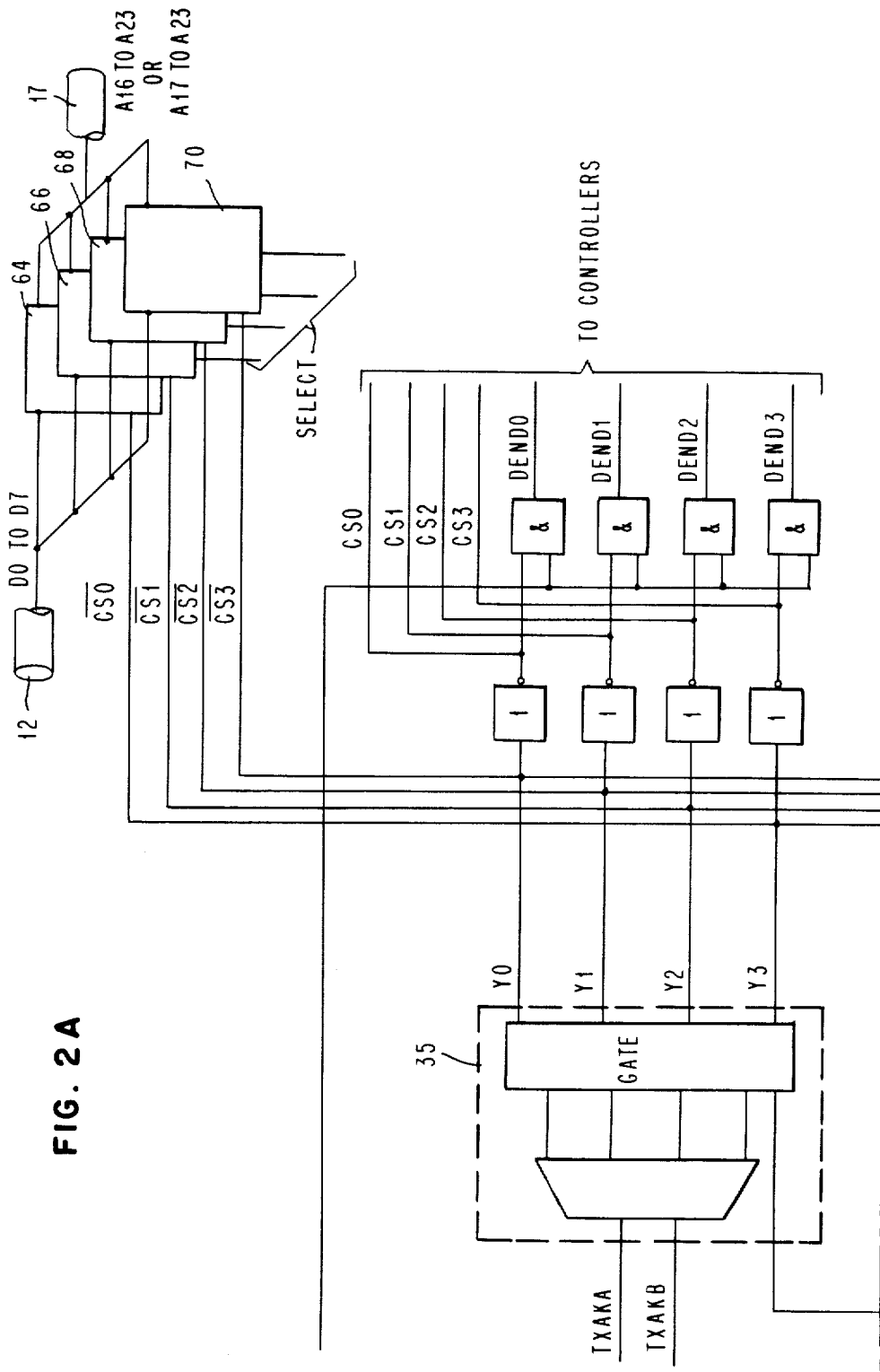
FIG. 2 is a logic diagram of the block entitled multimode control in FIG. 1.
Figure 2B:
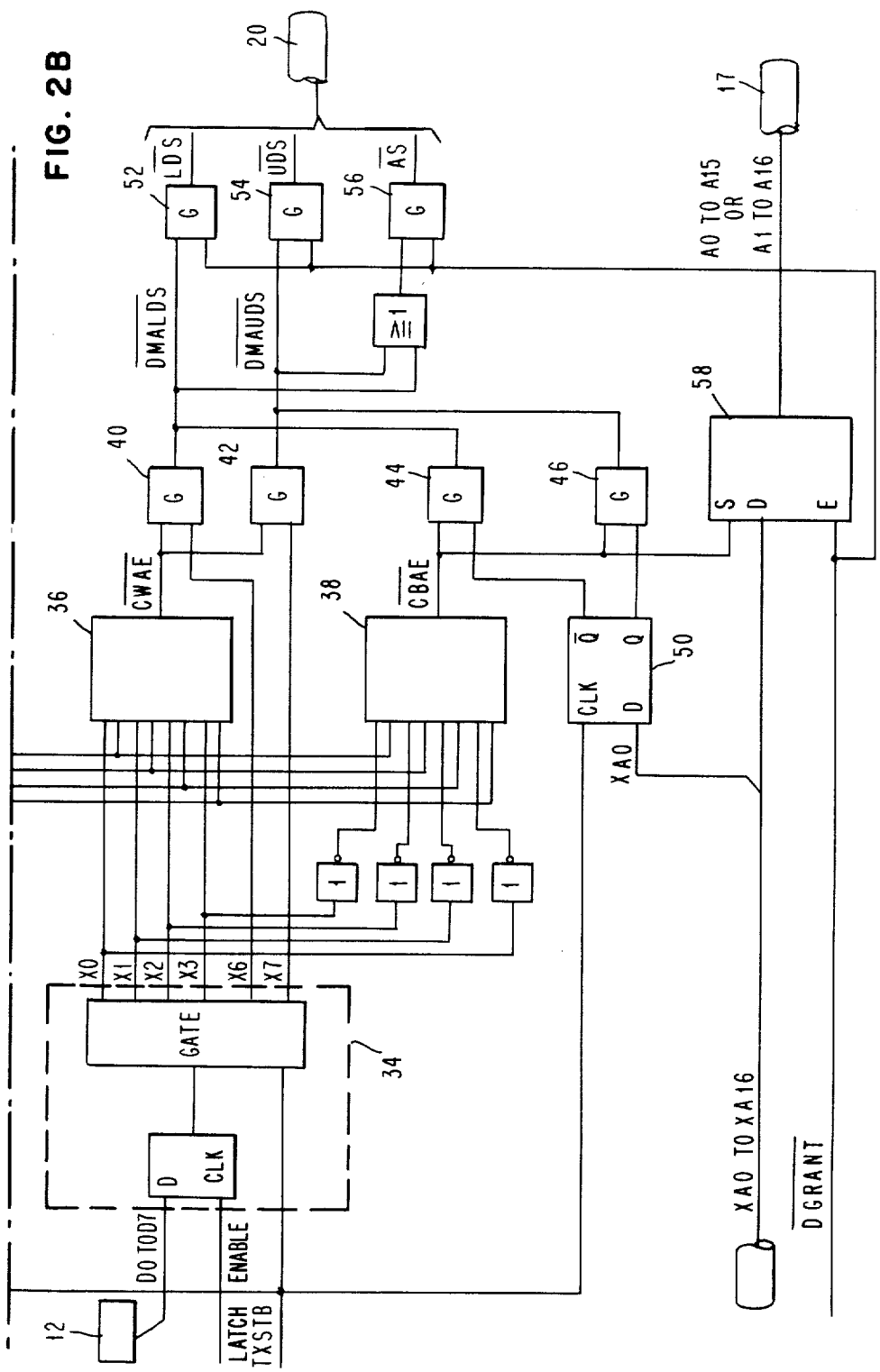

Referring now to both FIGS. 1 and 2, the MPU 10 places a mode control signal onto bits D0 to D7 of the data bus 12 and an address signal on the address bus 14. When the $\overline{AS}$ and $\overline{LDS}$ signals come up, this address is decoded by decoder 18 to an access signal for a mode control latch 30. This access signal called the latch enable signal is fed to the clock input (CLK) of eight latches at the mode control switch 34 entering the mode control signal on bits D0 to D7 of the data bus 12 into those latches 34. When the MPU 10 later issues a Bus Grant signal to the DMAC 26, the DMAC takes control and generates a transfer strobe $\overline{TXSTB}$, coded mode control data is gated out of the registers. The first four bits X0 to X4 of the coded mode control signal each represent the mode of data transfer for one of the four channels of the DMAC. If the bit is a "1" the channel is to perform a word transfer and if the bit is a "0" the channel is to perform a byte transfer. Upon the occurrance of the TXSTB signal X0 to X4 are fed to two sets of transfer mode decode gates 36 and 38. The sets of gates are AND-OR invert gates of the type described on page 3-89of a manual entitled TTL Logic Data Manual published by the Synetics Corporation.

These gates 36 and 38 also receive a four bit signal which indicates which channel is being activated. This signal is generated from the TXAKA and TXAKB signal generated in accordance with the "Motorola microprocessors" manual mentioned above. As shown in FIG. 10 of that manual. These two outputs of the DMAC can be decoded to provide start and end signals on data transfers to the peripheral devices associated with each of the DMAC channels. In the present application, the output of decoder 35 used to generate those signals $\overline{DEND0}$ to $\overline{DEND3}$ and CS0 to CS3 is also used to provide the four bit signal fed to the gates 36 and 38. The occurrance of a match in gate set 36 or 38 of an active output X0 to X3 from switch 34 with the selected level of the outputs Y0 to Y3 of decoder bit that gate set 36 or 38 generates a control byte address enable signal $\overline{CBAE}$ or a control word address enable signal $\overline{CWAE}$ signal to indicate whether a byte or word transfer mode is being requested.

The $\overline{CWAE}$ signal is fed to two gating circuits 40 and 42. The gates 40 and 42 also receive the outputs X6 and X7 of the mode control switch 34. When both X6 and X7 are both "1", the DMAC substitutes, $\overline{DMALDS}$ and $\overline{DMAUDS}$ for the $\overline{LDS}$ and $\overline{UDS}$ signals, to indicate a full word transfer. If one of the X6 or X7 signals is "1" while the other is "0" then only one of the $\overline{DMALDS}$ or $\overline{DMAUDS}$ outputs is produced indicating byte transfer on either the upper or lower data byte of the data bus 12. Gates 44 and 46 also receive the $\overline{Q}$ and Q outputs of the latch 50. The latch 50 latches the lowest order address bit XAO on occurrence of the TXSTB signal to support transfer of contiguous byte data, a byte at a time. This address bit will indicate whether the byte transfer is of the upper or lower bytes of the data bus. If XAO is 1 the lower data byte is being transferred. If XAO is 0 the upper data byte is being transfered. The $\overline{DMAUDS}$ and $\overline{DMALDS}$ signals are fed to gates 52 and 54 respectively and are also ORed together and fed to gate 56. So long as the $\overline{DGrant}$ signal is presented by the MPU 10 the outputs of gates 52 to 56 are placed on the control signal bus 20 as the $\overline{LDSUDS}$ and $\overline{AS}$ signals.

The address bits XA0-XA15 from the DMAC 26 are also fed to multiplexers 58 which either pass them through unchanged into the system address bus 17 when a word transfer is executed or offset them by one bit position downward when a byte transfer operation is in effect. The XA0 bit being the least signficant address bit is used to generate the $\overline{\text{UDS}}$ or $\overline{\text{LDS}}$ signal during the byte transfers. The remainder of the address identifies the word location containing the byte. To accomplish this, the $\overline{\text{CBAE}}$ signal is fed to each one of these multiplexers. When the $\overline{\text{CBAE}}$ signal is inactive, the offset is accomplished. When the CWAE signal is active no DMAC address offset is performed. The multiplexers are of the type described beginning on page 3-387 in the manual entitled TTL Logic Data Manual 1982 published by Signetics Corp.

Figure 3:
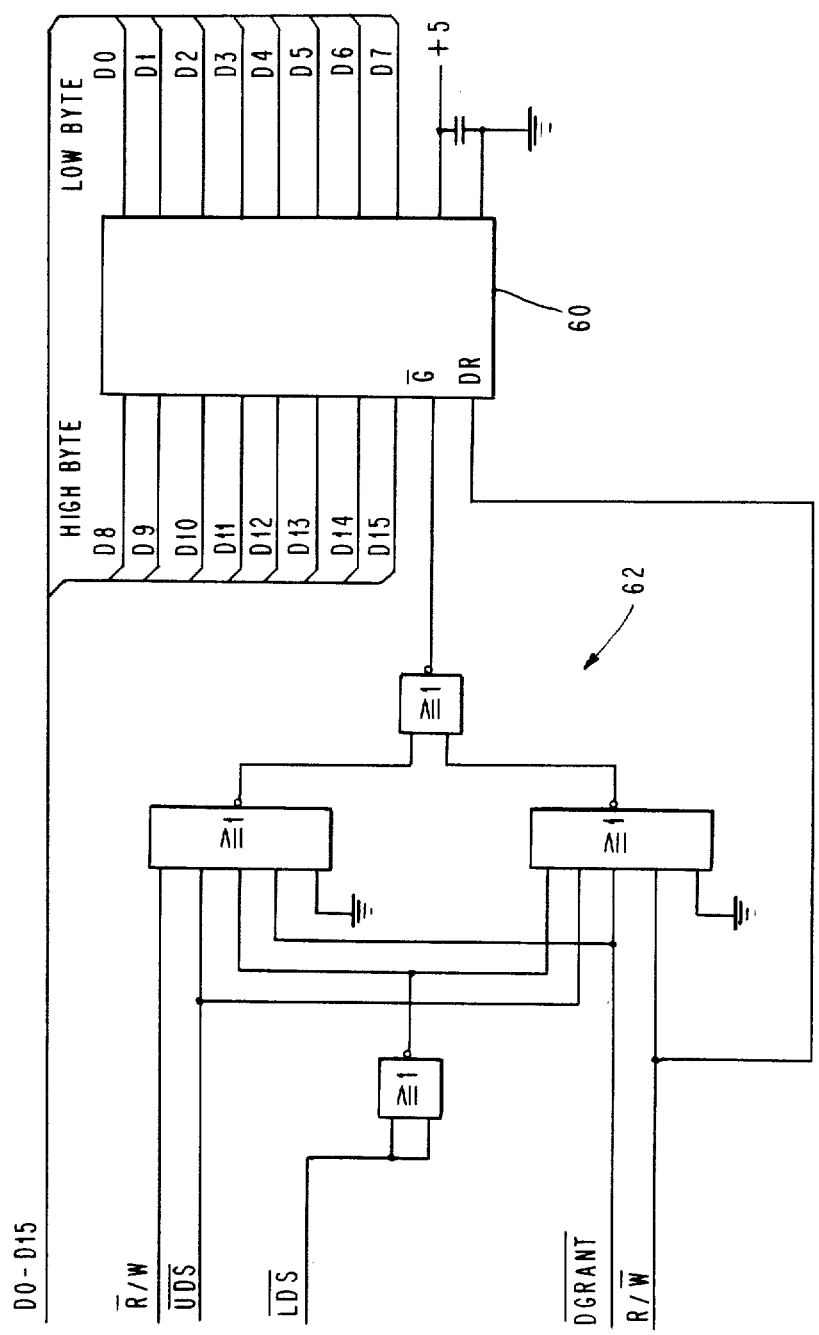
FIG. 3 is a block diagram of the block entitled byte replicate control in FIG. 1.

Referring now to FIG. 3, the byte replicate circuit 32 contains a bidirectional driver 60 which receives signals off the data bus 12 and duplicates it on the other one of the two bytes D0 to D7 or D8 to D15. As can be seen from the logic 62 this byte replication occurs only when only one of the LDS or UDS is active not when both are active. The direction of replication is determined by whether data is being written into main memory or read from main memory. When data is being written into main memory, the data on the lower data code will be duplicated on the upper data byte and when main memory is being read data on the upper data byte will be duplicated on the lower data byte.

Referring back to FIG. 2, four latches 64 to 70 identical to the mode control switch, or counters if preferred, receive data from the MPU 10 on the lower data byte D0 to D7 of the data bus 12 when each is separately enabled by the MCU 10 and transfers that data out on the upper portion of the address bus to one of the channels of the DMAC on the address bus 17 when it is activated by the output of decoder 35. This is the block address that is not supplied by the DMAC during DMA transfer and must be supplied by the MPU before the DMAC transfer is executed.

Above I have described one embodiment of the invention. It should be apparent to those skilled in the art that many modifications and changes can be made in this described embodiment without departing from the spirit and scope of the invention as represented in the attached claims.

Having thus described my invention, what I claim as new and desire to secure by Letters Patent is:

1. In a data processing system having a bus system interconnecting the various elements of the data processing system including a plurality of I/0 devices, a memory in which data is stored in words each having a high byte and a low byte, comprising;
   a processor generating a set of control signals to transfer data indirectly between said I/0 devices and memory on said bus system through said processor in a plurality of different modes, including;
   a first mode in which data is transferred one word at a time,
   a second mode in which data is transferred one byte at a time including either high or low contiguous bytes,
   a third mode in which data is transferred only one high byte at a time, and
   a fourth mode in which data is transferred only one low byte at a time;
   a synchronous control means providing transfer signals to transfer data directly between said I/0 devices and memory on said bus system without going through said processor in only a single mode of data transfer;
   a means for providing plural modes of data transfer during direct memory access using said synchronous control means asynchronously, including;
   a control signal generation means responsive to said processor and said transfer signals of said control means for generating mode signal substitutes for said set of control signals for transferring data in any of said plural modes, including a decode means for decoding an instruction, sent by the processor to the control signal generation means, into an output signal indicating the type of data transfer; and
   means coupled to said control signal generation means responsive to said generated mode control signals and the output signal of said decode means for transferring data between said memory and said I/0 devices in accordance with the mode signals generated by the control signal generation means, whereby data can be transferred asynchronously in said plurality of different modes using said synchrounous control means.

2. The data processing system of claim 1 wherein:
   said bus system includes a data bus with two byte sections for carry data and
   said second means includes means for duplicating data on one byte section of the data bus onto the other byte section of the data bus.

* * * * *